D. E. HAIN.
WINDOW CLEANER.
APPLICATION FILED APR. 9, 1917.
1,275,553.
Patented Aug. 13, 1918.
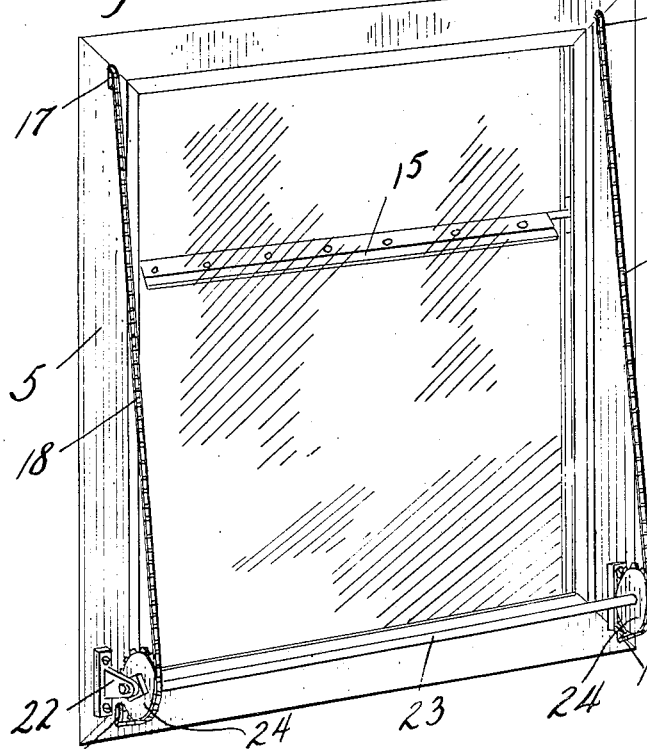
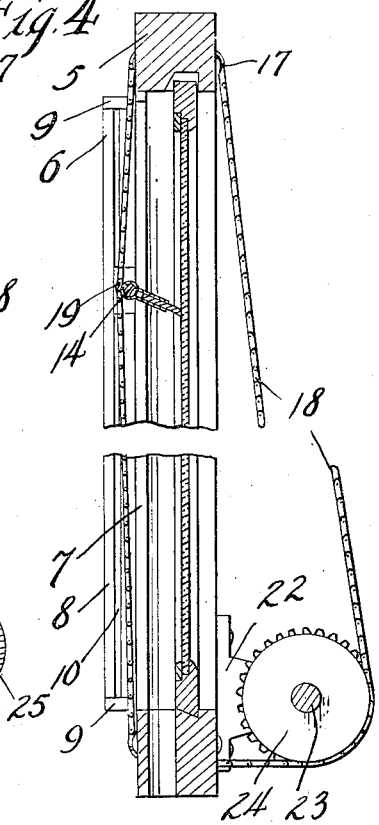
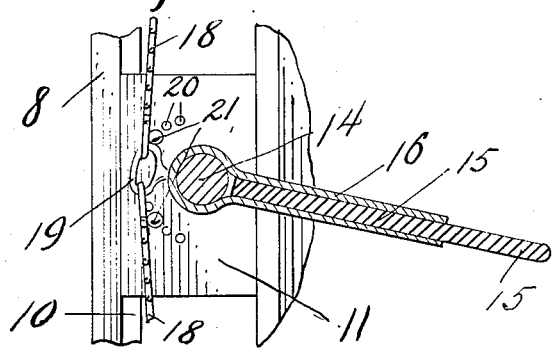
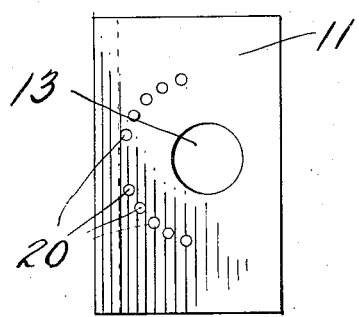
Witnesses
G. C. Walling
Inventor
D. E. Hain
By Chandler & Chandler
Attorney

UNITED STATES PATENT OFFICE.

DAVID E. HAIN, OF NEW CUMBERLAND, PENNSYLVANIA.

WINDOW-CLEANER.

1,275,553.  Specification of Letters Patent.  Patented Aug. 13, 1918.

Application filed April 9, 1917. Serial No. 160,731.

*To all whom it may concern:*

Be it known that I, DAVID E. HAIN, a citizen of the United States, residing at New Cumberland, in the county of Cumberland, State of Pennsylvania, have invented certain new and useful Improvements in Window-Cleaners; and I do hereby declare the following to be a full, clear, and exact description of the invention, such as will enable others skilled in the art to which it appertains to make and use the same.

This invention relates to new and useful improvements in window cleaners.

The main object of the invention is to provide a device by which snow, sleet, rain and the like may be removed from the exposed surface of window panes such as street car vestibules, locomotive windows, automobile wind shields and the like.

A further object of the invention is to provide a device of this character which is operable from the interior side of the window.

A further object of the invention is to provide a wiper which is automatically reversed in its position with respect to the window during its different movements.

A further object of the invention is to provide operating means to move the wiper in engagement with the window, said operating means serving to reverse the wiper as above stated.

Referring to the drawings:

Figure 1 is a perspective view of a window showing the improved device thereon,

Fig. 2 is a detail view of one of the sliding wiper supporting blocks,

Fig. 3 is a detail sectional view of the wiper, and

Fig. 4 is a longitudinal sectional view of a window with the device in place thereon.

Referring more particularly to the drawings, the reference character 5 designates a window frame or sash, to the outer face of which is suitably secured on opposite sides thereof guide members 6. These guide members 6 comprise two parallel members 7 and 8 secured together in spaced relation by end members 9. The inner face of the member 8 is provided with an integral rib 10, and slidably mounted between the guide members 7 and 8 are blocks 11 and engaged by the rib guide member 10.

These blocks 11 are provided with perforations 13 and mounted in said perforations 13 is a shaft 14 to which is rigidly secured a wiper 15, said wiper being secured to the shaft by means of a sheet metal plate 16.

The window frame 5 is provided near each of its ends with sprockets 17, and passing over said sprockets are chains or the like 18, the free ends of which are secured to a lever 19 which extends at right angles to the shaft 14. Each of the blocks 11 is provided near its perforation with a plurality of openings 20 arranged in substantially circular relation, and adapted to be received within these openings are pins 21, said pins being positioned in the path of the levers 19.

Secured to the inner face of the frame 5 on opposite sides thereof are brackets 22 and mounted in said brackets is a shaft 23. Secured to said shaft 23 and arranged in alinement with the sprockets 17 are sprockets 24, and said chains 18 are adapted to pass around the sprockets 24 as shown. The shaft 23 is further provided with an operating wheel 25 by which the shaft is rotated.

From the foregoing it will be seen that if the operating wheel 25 is rotated the shaft 23 is likewise rotated thus rotating the sprockets 24. Through the medium of the chains 18 it will be seen that the shaft 14 is rocked in its bearings in the blocks 11 until the levers 19 engage the pins 21 which limit the rotary movement of the shaft 14 to position the wiper at the proper angle to the window pane. Upon continued movement of the operating wheel 25, the chains 18 will act to move the wiper upwardly or downwardly in contact with the window pane to remove the snow, etc., therefrom, the movement of the wiper being determined by the direction in which the operating wheel 25 is turned.

From the foregoing it will be seen that the present invention provides means by which a wiper moved in contact with the pane of a window, and through the medium of the operating mechanism is automatically positioned with respect to the window pane.

Having thus described the invention, what is claimed is:—

In a device of the character described, vertical guide members adapted to be mounted on opposite sides on a window frame, blocks slidably mounted in the guides, one of said blocks having a series of holes therein, a shaft journaled horizontally in said blocks, a wiper carried by said shaft, levers on said shaft, guide pulleys adapted to be mounted in the window frame above and below the guide members, flexible cables trained over the pulleys and each cable having its ends connected to one of the levers, means for operating the cable, and adjusting pins engaged in the holes in one of the blocks on opposite sides of the lever for the contact thereof with the same.

In testimony whereof I affix my signature in the presence of two witnesses.

DAVID E. HAIN.

Witnesses:
H. E. GETZ,
W. H. DAVIS.